United States Patent
Schindler et al.

(10) Patent No.: US 7,015,297 B2
(45) Date of Patent: *Mar. 21, 2006

(54) METHOD OF INCREASING THE ELASTICITY OF MOISTURE-CURED ELASTOMERS

(75) Inventors: Wolfram Schindler, Tüssling (DE); Elke Schwiebacher, Simbach (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/967,903

(22) Filed: Oct. 18, 2004

(65) Prior Publication Data

US 2005/0101753 A1  May 12, 2005

(30) Foreign Application Priority Data

Nov. 6, 2003  (DE) ................ 103 51 804

(51) Int. Cl.
*C08G 77/04* (2006.01)

(52) U.S. Cl. .............. 528/34; 525/474; 525/342

(58) Field of Classification Search ........... 528/34; 525/474, 342
See application file for complete search history.

(56) References Cited

U.S. PATENT DOCUMENTS

| 3,971,751 A | 7/1976 | Isayama et al. | |
|---|---|---|---|
| 2004/0072921 A1 | 4/2004 | Stanjek et al. | |
| 2004/0181025 A1* | 9/2004 | Schindler et al. | 528/38 |
| 2004/0204539 A1* | 10/2004 | Schindler et al. | 524/588 |

FOREIGN PATENT DOCUMENTS

| DE | 198 49 817 A1 | 5/2000 |
|---|---|---|
| DE | 199 23 300 A1 | 11/2000 |
| DE | 100 64 086 C1 | 4/2002 |
| EP | 0 269 819 A2 | 6/1988 |
| EP | 0 370 464 A2 | 5/1990 |
| EP | 0 565 078 A1 | 10/1993 |
| EP | 0 931 800 A1 | 7/1999 |
| WO | WO 99/06486 | 2/1999 |
| WO | WO 00/37533 | 6/2000 |
| WO | WO 02/066532 | 8/2002 |
| WO | WO 02/066532 A1 | 8/2002 |
| WO | WO 03/018658 A1 | 3/2003 |
| WO | WO 03/059981 A1 | 7/2003 |

OTHER PUBLICATIONS

Derwent Abstract correspondong to WO 99/06486.
Derwent Abstract corresponding to EP 0 269 819 A2.
Derwent Abstract corresponding to DE 100 64 086 C1.
Derwent Abstract corresponding to WO 03/059981A1.
Derwent Abstract corresponding to DE 199 23 300 A1.
Derwent Abstract correspondong to DE 198 49 817 A1.
Derwent Abstract corresponding to WO 03/018658 A1.
Derwent Abstract corresponding to WO 02/066532 A1.

* cited by examiner

*Primary Examiner*—Kuo-Liang Peng
(74) *Attorney, Agent, or Firm*—Brooks Kushman P.C.

(57) ABSTRACT

The invention provides a method of increasing the elasticity of moisture-cured elastomers, which comprises adding to alkoxy-cross linking one-component compositions comprising an alkoxysilane-terminated polymer (A) containing end groups of the formula (1)

$$-A-Si(R)_a(CH_3)_{3-a} \qquad (1)$$

a silane (B), of the general formula (2)

$$X-CH_2-Si(R)_2(CH_3) \qquad (2)$$

where
A is a divalent hydrocarbon radical,
R is a methoxy or ethoxy group,
X is a group R"O—, R"NH—, R'—O—CO—NH, R'—NH—CO—NH— or halogen,
R" is hydrogen, an optionally halogen-substituted $C_{1-18}$ hydrocarbon radical or a radical R'—O—CO— or R'—NH—CO,
R' is an optionally halogen-substituted $C_{1-8}$ hydrocarbon radical, and
a is 1, 2 or 3.

20 Claims, No Drawings

METHOD OF INCREASING THE ELASTICITY OF MOISTURE-CURED ELASTOMERS

BACKGROUND OF THE INVENTION

1. Field of the Invention

The invention relates to a method of increasing the elasticity of moisture-cured elastomers comprising alkoxy-cross linking one-component compositions.

2. Background Art

Organic polymers with silane end groups in the form of one-component, moisture-curing compositions (RTV-1) are known and are much used for producing elastic sealants and adhesives. Polymers of this kind may be synthesized from different building blocks. Normally these are polyurethane, polyethers, polyesters, polyacrylates, polyvinyl esters, ethylene-olefin copolymers, styrene-butadiene copolymers or polyolefins. It is known that in order to provide stability during processing and storage of the compounded formulations, low molecular weight compounds possessing hydrolyzable groups, which have more enhanced reactivity with respect to water than the silane-terminated polymers, are added to these one-component compositions. The amount of added water scavengers is guided by the water content of the ingredients of the composition and by the desired storage stabilities and processing lives. Generally these are organofunctional silanes, the organic radical in many instances being critical to the reactivity. Examples of such silanes are vinyltrimethoxysilane, alkylaminopropyltrimethoxysilanes, but also, for example, silanes which bind water with concomitant formation of ammonia, for example hexamethyldisilazane.

Examples of alkoxysilane-terminated polymers with an organic backbone and processes for preparing crosslinkable compositions are described for example in EP-A-269 819, EP-A-370 464, EP-A-565 078, EP-A-931 800, WO 00/37533, U.S. Pat. No. 3,971,751 or DE-A-198 49 817. The same is true of organosiloxanes in a multiplicity of patents and publications (e.g., WO 99/06486).

Terminal groups in one component organic polymer systems are generally substituted propyltrimethoxysilanes, since the latter are generally readily available and exhibit very good reactivity in the compositions. These polymers, however, owing to their high reactivity, are also problematic in terms of processing, particularly in connection with incorporation of water-containing fillers or additives which further increase the reactivity. Additionally, the storage stabilities of the resulting compositions are frequently inadequate. For example, the addition of relatively large amounts of aminosilanes as adhesion promoters can greatly reduce the storage stability. The compositions generally have to be stabilized via further added components such as the phosphoric esters described in DE 19923300, in order to moderate the catalyst activity. Moreover, addition of standard water scavengers such as vinyltrimethoxysilane is only of limited aid in stabilizing the compositions.

More recent one-component systems use not only the propyl-spaced silanes, but also so-called alpha-silanes as crosslinkable groups for the end blocking of the polymers, as described for example in WO 02/066532 or WO 03/018658. In these systems it is also possible to install highly reactive difunctional or even monofunctional end groups as described in WO 03/059981, bringing substantial advantages with respect to elasticity.

A substantial disadvantage of many systems, is the divergent effect between the chain length and hence molecular weight of the polymer to be used, and the processing properties in terms of the viscosity. High molecular weights are of advantage not only on account of the resultant higher mechanical strength, but are also an important prerequisite for preparing low-modulus elastomers, as required particularly in sealants. If polymers of relatively low viscosity can be used in compositions of this kind, then establishing the processing properties becomes much easier and more flexible. This is a problem specifically in the case, inter alia, of silane-terminated polyurethanes. In such cases, it is virtually impossible to prepare low-modulus compositions without markedly impairing the mechanical properties as a result of necessary additions of plasticizer.

SUMMARY OF THE INVENTION

It would be greatly desirable, therefore, to provide alkoxysilane-terminated polymer systems which on curing not only crosslink, but also bring about chain extension of the polymers. It has now been surprisingly and unexpectedly discovered that by incorporating dialkoxy alpha-silanes, the reactivity of such compositions is also sufficiently high that it is possible to produce compositions without the use of relatively large amounts of catalysts which generally contain tin. The dialkoxy alpha silanes, bearing reactive functionality linked to silicon through a methylene spacer, provide outstanding water scavenging, and have desirable influences on shelf life, skin formation times, and elasticity.

DETAILED DESCRIPTION OF THE PREFERRED EMBODIMENT(S)

The invention thus provides a method of increasing the elasticity of moisture-cured elastomers which comprises adding to alkoxy-cross linking one-component compositions comprising at least one alkoxysilane-terminated polymer (A) containing end groups of the general formula (1)

$$-A-Si(R)_a(CH_3)_{e-a} \qquad (1),$$

at least one silane (B), of the general formula (2)

$$X-CH_2-Si(R)_2(CH_3) \qquad (2),$$

where

A is a divalent hydrocarbon radical,

R is a methoxy or ethoxy group,

X is a group R'O—, R"NH—, R'—O—CO—NH—, R'—NH—CO—NH—, or halogen,

R" is hydrogen, an optionally halogen-substituted $C_{1-18}$ hydrocarbon radical, or a radical R'—O—CO— or R'—NH—CO—, R' is an optionally halogen-substituted $C_{1-8}$ hydrocarbon radical, and a is 1, 2 or 3.

The cured compositions based on alkoxyorganosilane-terminated polymers (A) possess excellent elasticity. At the same time the compositions combine good storage stability with outstanding curing characteristics. It has in fact been found that the addition of difunctional silanes with methylene spacers (alpha-silanes) of the general formulae (2) to polymers (A) is suitable for making such compositions more elastic with no deterioration in the storage stability. Also no adverse effect is found on the curing kinetics or the volume curing of the materials. This is confirmed by good figures for skin-forming times, residual tack, etc. In contrast to the known, existing compounds, it has become possible, through the very high reactivity of the silanes of the general formula (2), to add these silanes as difunctional water scavengers.

Since the silanes of the general formula (2) exhibit sufficiently high reactivity, the skin-forming times and volume curing times are dependent only to a small extent on the amount of silane. Consequently, it is possible to prepare compositions which are stabilized even in the presence of relatively large amounts of water, which emerge, for example, from fillers during the course of storage, without any significant deterioration in volume curing.

The polymers (A) preferably comprise a framework or backbone, of polyurethane, polyether, polyester, polyacrylate, polyvinyl ester, ethylene-olefin copolymer, styrene-butadiene copolymer or polyolefin. The polymers (A) comprising a polyether, polyester or polyurethane framework preferably possess molecular weights Mn of 5000 to 50,000 Da (Daltons), in particular 10,000 to 25,000 Da, and preferably have viscosities of not more than 200 Pas, in particular not more than 100 Pas at 25° C.

In the above general formulae (1) and (2), preferably:

R" is hydrogen, an optionally halogen-substituted cyclic, linear or branched $C_{1-18}$ alkyl radical, especially a $C_{1-6}$ alkyl radical, or an $C_{6-18}$ aryl radical, especially a $C_{6-10}$ aryl radical, specifically a butyl, cyclohexyl or phenyl radical, R' is a $C_{1-4}$ alkyl or phenyl radical, specifically a methyl or ethyl radical, A is a divalent linear or branched alkyl radical, preferably having 1 to 18 carbon atoms, in particular having 1 to 6 carbon atoms, in particular a methylene or a trimethylene group, and a is 2 or 3.

There are a multiplicity of possibilities known for preparing the silane-terminated polymers (A), including in particular the following:

copolymerization of unsaturated monomers with monomers containing, for example, alkoxysilyl groups, such as vinyltrimethoxysilane.

grafting of unsaturated monomers such as vinyltrimethoxysilane onto thermoplastics such as polyethylene.

the addition of H-silanes such as methyldimethoxysilane onto the carbon double bonds under noble metal catalysis.

reaction of organosilanes with prepolymers. In this case one functional group of the prepolymer is reacted with one functional group of the silane.

The widely adopted and most simple path for the last-mentioned case is the reaction of NCO groups of an isocyanate prepolymer with an aminosilane of the general formula (3):

$$R^1—NH-A-Si(R)_a(CH_3)_{3-a} \qquad (3).$$

It is additionally possible, accordingly, to react OH groups of a polyurethane prepolymer, or else of any of a very wide variety of other polymer frameworks, such as pure polyesters, for example, with an isocyanatosilane of the general formula (4):

$$OCN-A-Si(R)_a(CH_3)_{3-a} \qquad (4).$$

In the general formulae (3) and (4)

$R^1$ is hydrogen or an optionally halogen-substituted alkyl radical having 1 to 18 carbon atoms, in particular 1 to 6 carbon atoms, or aryl radical having 6 to 18, in particular 6 to 10 carbon atoms, A, R and a have the definitions given previously.

Preferably A in the general formulae (3) and (4) is trimethylene, R is methoxy, $R^1$ is phenyl, cyclohexyl or a linear alkyl radical such as ethyl or butyl, and a is 3.

In one preferred embodiment the alkoxysilane-terminated polymers (A) contain end groups of the general formula (5)

$$—NR^1—CH_2—Si(R)_a(CH_3)_{3-a} \qquad (5).$$

This alkoxysilane-terminated polymer can be prepared by analogy to the processes described above, by reacting NCO groups of an isocyanate-terminated prepolymer with an aminosilane of the general formula (6):

$$R^1NH—CH_2—Si(R)_a(CH_3)_{3-a} \qquad (6)$$

Furthermore it is possible, correspondingly, to react terminal OH groups of an isocyanate-derived prepolymer (i.e. one prepared using a stoichiometrtic deficiency of di- or polyisocyanate), and also isocyanate reactive groups of a very wide variety of other polymer frameworks, such as pure polyesters, for example, with an isocyanatosilane of the general formula (7).

$$OCN—CH_2—Si(R)_a(CH_3)_{3-a} \qquad (7)$$

In the general formulae (5) and (6) and (7) $R^1$, R, and a are as defined above. Preferably $R^1$ is phenyl, cyclohexyl or a linear $C_{1-4}$ alkyl radical such as ethyl or butyl, and a is 2 or 3.

In the case of silane-terminated polymers (A) having end groups of the general formula (5) it has been found that they are very difficult to compound, owing to their very high reactivity. The water content of common fillers and additives frequently leads of itself to gelling of the composition in the course of blending, the resultant composition then being almost impossible to process. Moreover, these compositions are problematic in terms of storage stability, and cannot be stored for a prolonged period: as a general rule they become stiff in the cartridge. An attempt to stabilize these compositions during preparation using the standard water scavengers previously described, was unsuccessful.

In contrast to the water scavengers, silane-terminated polymers (A) having end groups of the general formula (5), owing to the very high reactivity of the silanes of the general formulae (2), can be stabilized for sufficiently long periods in terms of processing, without gelling. The processing life can also be adjusted here by means of the amount of silane added. The processing lives, the skin-forming time and the volume of curing, however, remain very rapid.

As polymers (A) it is also possible to use polymers having a framework comprising polydiorganosiloxane and end groups of the general formula (1). It is preferred to add silanes of the general formula (6) onto hydroxyalkyl- or aminoalkyl-terminal silicone oils.

Common silicone polymers prepared by end blocking of Si—OH-terminated silicone oils with alkoxy-functional silanes such as vinyltrimethoxysilane or methyltrimethoxysilane can also be used instead of the polymers (A), in a further embodiment.

Examples of organo-functional silanes (B) of the general formula (2) are aminomethyl-methyldimethoxysilane, aminomethyl-methyldiethoxysilane, phenylaminomethyl-methyldimethoxysilane, butylaminomethyl-methyldimethoxysilane, cyclohexylaminomethyl-methyldimethoxysilane, methoxymethyl-methyldimethoxysilane, ethoxymethyl-methyldiethoxysilane, methylcarbamatomethyl-methyldimethoxysilane, ethylcarbamatomethyl-methyldiethoxysilane, and chloromethyl-methyldimethoxysilane.

Preference is given to cyclohexylaminomethyl-methyldimethoxysilane, phenylaminomethyl-methyldimethoxysilane and the corresponding ethoxy derivatives, with particular preference given to methylcarbamatomethyl-methyldimethoxysilane and ethylcarbamatomethyl-methyldiethoxysilane, which on account of their relatively low basicity have no additional accelerating effect on the reactivity.

Preferably from 0.1 to 20 parts by weight, more preferably from 0.5 to 10 parts by weight and in particular from 2 to 6 parts by weight of silanes (B) are added to the compositions per 100 parts by weight of polymer (A).

A catalyst for curing can be added as component (C) to the compositions. As component (C) it is possible to use acidic compounds such as phosphoric acid derivatives or carboxylic acid derivatives, basic compounds such as primary, secondary and tertiary amines or else organometallic catalysts such as those of the metals tin, titanium, zinc or bismuth. Additionally it is also possible to use organic nitrogen compounds which carry a silyl group. Examples of suitable bases containing a silyl group are amino-containing silanes such as aminopropyl-trimethoxysilane, aminopropyl-triethoxysilane, aminomethyl-trimethoxysilane, aminomethyl-triethoxysilane, aminoethylaminopropyl-trimethoxysilane, butylaminopropyl-trimethoxysilane, butylaminomethyl-trimethoxysilane, cyclohexylaminomethyl-trimethoxysilane, and cyclohexylaminopropyl-trimethoxysilane.

As component (D), additionally, it is possible to add conventional auxiliaries to the compositions, such as adhesion promoters, plasticizers, fillers, thixotropic agents, light stabilizers, fungicides and pigments known for use in alkoxy-cross linking one-component compositions.

All of the above symbols in the above formulae have their definitions in each case independently of one another. In all formulae the silicon atom is tetravalent. Thus multicomponent mixtures containing both a variety of polymers (A) and a variety of silanes (B) are contemplated.

The examples below serve to illustrate the invention without restricting it. Unless specified otherwise, all amounts and percentages are by weight, all pressures are 0.10 MPa (abs.) and all temperatures are 20° C.

EXAMPLES

Alkoxy-Cross Linking One-Component Compositions Were Prepared

Alkoxysilane-terminated polyesters (A) were prepared in accordance with WO 03/018658, using a difunctional polyether having a high degree of OH functionalization (Acclaim® 12200N, available from Bayer AG). The isocyanatosilanes used for end termination, 3-isocyanatopropyl-trimethoxysilane for polymer A1 and isocyanatomethyl-methyldimethoxysilane for polymer A2, were prepared in accordance with DE 100 640 86.

Water scavenger silanes used were methylcarbamatomethyl-trimethoxysilane comparative: (GENIOSIL® XL 63), methylcarbamatomethyl-methyldimethoxysilane (silane (B), GENIOSIL® XL 65), and vinyl-trimethoxysilane (comparative: GENIOSIL® XL 10), all available from Wacker-Chemie GmbH.

| Base formulation (in % by weight) | |
|---|---|
| Silane-terminated polymer A1/A2 | 40.0 |
| Diisodecyl phthalate | 10.04 |
| Silica Wacker HDK ® H2000 | 9.0 |
| Chalk Omya ® BLR3 | 0.10 |
| N-(2-Aminoethyl) (-3-aminopropyl) trimethoxysilane (GENIOSIL ® GF 91) | 0.50 |
| Water scavengers: GENIOSIL ® XL63, GENIOSIL ® XL65, GENIOSIL ® XL10 | additive (variable) |

Blending took place in a laboratory mixer from Hauschild (Speed Mixer DAC 150 AF). The silanes were incorporated before the fillers were added (chalk, silica). The dibutyltin dilaurate and GENIOSIL® GF 91 catalysts were added as a final step. Mixing times for the individual steps: 20 s/2500 rpm, 60 s/2500 rpm, 60 s/2500 rpm.

The mechanical properties were determined in accordance with DIN 53504 (tensile testing) and DIN 53505 (Shore A hardness).

| Polymer | A1 | | A2 | | | | | | | |
|---|---|---|---|---|---|---|---|---|---|---|
| Example[1] | C1 | 2 | C3 | C4 | 5 | 6 | 7 | 8 | C9* | 10 |
| GENIOSIL ® XL 63 (% by wt.) | | | 1.0 | 2.0 | | 1.0 | 0.5 | | | |
| GENIOSIL ® XL 65 (% by wt.) | | 2.0 | | | 2.0 | 1.0 | 2.0 | 4.0 | | 2.0 |
| GENIOSIL ® XL 10 (% by wt.) | 2.0 | | | | | | | | 2.0 | 2.0 |
| Skin-forming time in minutes immediately after compounding | 20 | 35 | 25 | 25 | 50 | 35 | 40 | 70 | 35 | 40 |
| Tube Storage at 70° C. | | | | | | | | | | |
| Skin-forming times in minutes after 1 week | 15 | 20 | 10 | 15 | 40 | 15 | 35 | 60 | 40 | 35 |
| Skin-forming times in minutes after 2 weeks | 20 | 25 | 5 | 20 | 45 | 20 | 30 | 80 | 65 | 50 |
| Vulcanizate after 2 weeks of storage at 23° C./50% relative atomospheric humidity | | | | | | | | | | |
| Modulus in N/mm$^2$ | 1.7 | 0.9 | 1.3 | 1.2 | 0.8 | 1.1 | 0.9 | 0.5 | 1.0 | 1.0 |
| Elongation at break in % | 130 | 350 | 280 | 250 | 530 | 400 | 520 | 490 | 260 | 390 |
| Tensile strength in N/mm$^2$ | 2.1 | 1.8 | 2.4 | 2.1 | 1.9 | 2.5 | 2.2 | 1.5 | 2 | 2.2 |
| Shore A hardness | 58 | 35 | 58 | 57 | 38 | 52 | 43 | 13 | 53 | 51 |

[1]Examples with a "C", e.g. "C1" are comparative examples.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of increasing the elasticity of moisture-cured elastomers, comprising adding to an alkoxy-cross linking one-component composition comprising at least one alkoxysilane-terminated polymer (A) containing end groups of the formula (1)

$$\text{-A-Si(R)}_a(\text{CH}_3)_{3-a} \qquad (1),$$

at least one silane (B), of the formula (2)

$$\text{X—CH}_2\text{—Si(R)}_2(\text{CH}_3) \qquad (2)$$

where

A each, independently, is a divalent hydrocarbon radical,
R each, independently, is a methoxy or ethoxy group,
X each, independently is a group R'O—, R'—O—CO—NH—, R'—NH—CO—NH—, or halogen,
R' each, independently, is an optionally halogen-substituted $C_{1-18}$ hydrocarbon radical, and
a each, independently, is 1, 2, or 3.

2. The method of claim 1, wherein the alkoxysilane-terminated polymer (A) comprises end groups of the general formula (5), $$\text{—NR}^1\text{—CH}_2\text{—Si(R)}_a(\text{CH}_3)_{3-a} \qquad (5)$$

wherein $R^1$ is hydrogen or an optionally halogen-substituted $C_{1-18}$ alkyl group or an optionally halogen-substituted $C_{6-18}$ aryl group.

3. The method of claim 2, wherein from 0.1 to 20 parts by weight of silane (B) are used per 100 parts by weight of polymer (A).

4. A one component moisture curable elastomer composition, prepared by the process of claim 2.

5. A cured elastomer, prepared by curing the one component moisture curing elastomer composition of claim 4.

6. A one component moisture curable elastomer composition, prepared by the process of claim 3.

7. The method of claim 1, wherein from 0.1 to 20 parts by weight of silane (B) are used per 100 parts by weight of polymer (A).

8. A one component moisture curable elastomer composition, prepared by the process of claim 3.

9. The method of claim 1, further comprising incorporating a condensation catalyst for curing.

10. A one component moisture curable elastomer composition, prepared by the process of claim 9.

11. The method of claim 1, wherein the polymers (A) are selected from the group consisting of polyurethane, polyether, polyester, polyacrylate, polyvinyl ester, ethylene-olefin copolymers, styrene-butadiene copolymers, polyolefin, and mixtures thereof.

12. A one component moisture curable elastomer composition, prepared by the process of claim 11.

13. The method of claim 1, wherein the polymers (A) comprise polydiorganosiloxane polymers.

14. A one component moisture curable elastomer composition, prepared by the process of claim 13.

15. The method of claim 1, wherein at least one silane (B) is selected from the group consisting of butylaminomethyl-methyldimethoxysilane, cyclohexylaminomethyl-methyldimethoxysilane, methoxymethyl-methyldimethoxysilane, ethoxymethyl-methyldiethoxysilane, methylcarbamatomethyl-methyldimethoxysilane, ethylcarbamatomethyl-methyldiethoxysilane or chloromethyl-methyldimethoxysilane.

16. A one component moisture curable elastomer composition, prepared by the process of claim 15.

17. The method of claim 1, wherein at least one silane (B) is selected from the group consisting of methylcarbamatomethyl-methyldimethoxysilane and ethylcarbamatomethyl-methyldiethoxysilane.

18. A one component moisture curable elastomer composition, prepared by the process of claim 17.

19. A one component moisture curable elastomer composition, prepared by the process of claim 1.

20. A cured elastomer, prepared by curing the one component moisture curing elastomer composition of claim 19.

* * * * *

UNITED STATES PATENT AND TRADEMARK OFFICE
CERTIFICATE OF CORRECTION

PATENT NO. : 7,015,297 B2
APPLICATION NO. : 10/967903
DATED : March 21, 2006
INVENTOR(S) : Wolfram Schindler et al.

It is certified that error appears in the above-identified patent and that said Letters Patent is hereby corrected as shown below:

Column 8, Line 5, Claim 8:

Delete "3" and insert -- 7 --.

Column 8, Line 22, Claim 15:

Should Read

The method of claim 1, wherein at least one silane (B) is selected from the group consisting of methoxymethyl-methyldimethoxysilane, ethoxymethyl-methyldiethoxysilane, methylcarbamatomethyl-methyldimethoxysilane, ethylcarbamatomethyl-methyldiethoxysilane or chloromethyl-methyldimethoxysilane.

Signed and Sealed this

Twelfth Day of February, 2008

JON W. DUDAS
*Director of the United States Patent and Trademark Office*